(12) United States Patent
Lou et al.

(10) Patent No.: US 9,215,049 B1
(45) Date of Patent: Dec. 15, 2015

(54) DATA STREAM INTERLEAVING WITH DIFFERENT ROTATION APPLIED TO CHANGED BIT STREAMS FOR SPATIALLY DIVERSE TRANSMISSION

(71) Applicant: Marvell International Ltd., Hamilton (BM)

(72) Inventors: Hui-Ling Lou, Sunnyvale, CA (US); Bhaskar Nallapureddy, Sunnyvale, CA (US); Atul Salhotra, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/664,601

(22) Filed: Mar. 20, 2015

Related U.S. Application Data

(63) Continuation of application No. 14/486,609, filed on Sep. 15, 2014, now Pat. No. 8,989,297, which is a continuation of application No. 14/148,353, filed on Jan. 6, 2014, now Pat. No. 8,837,623, which is a (Continued)

(51) Int. Cl.
*H04L 5/00* (2006.01)
*H04L 27/26* (2006.01)

(52) U.S. Cl.
CPC .......... *H04L 5/0023* (2013.01); *H04L 27/2637* (2013.01)

(58) Field of Classification Search
CPC ................. H03M 13/2789; H03M 13/2703; H03M 13/276; H03M 13/271; H04L 1/0071; H04L 5/0023; H04L 1/0009; H04L 1/0041; H04L 1/0618; H04L 2025/03426; H04L 27/2626

USPC .......... 375/260–261, 267, 299; 370/328–329, 370/334; 455/101–103
See application file for complete search history.

(56) References Cited

U.S. PATENT DOCUMENTS

| | | | |
|---|---|---|---|
| 7,170,849 | B1 | 1/2007 | Arivoli et al. |
| 7,295,625 | B2 | 11/2007 | Doetsch et al. |
| 7,308,047 | B2 | 12/2007 | Sadowsky |

(Continued)

OTHER PUBLICATIONS

"Information technology—Telecommunications and information exchange between systems—Local and metropolitan area networks—Specific requirements—Part 11: Wireless LAN Medium Access Control (MAC) and Physical Layer (PHY) specifications", ANSI/IEEE Std 802.11, 1999.

(Continued)

*Primary Examiner* — Khanh C Tran

(57) ABSTRACT

Systems and techniques relating to processing multiple data streams include, according to at least one implementation, an apparatus including a parser for a MIMO mode; an interleaver section coupled with the parser, configured to perform separate interleaving of bit streams during the MIMO mode, wherein a first portion of the interleaver section that handles a first of the two or more second bit streams employs a same interleaver operation as during a SISO mode of transmission; a subcarrier mapping section configured to perform separate mapping of subcarriers during the MIMO mode; and a transmit back end coupled with the subcarrier mapping section to connect with multiple antennas, the transmit back end configured to apply different rotations to dynamically changed second, third, and fourth ones of the two or more second bit streams transmitted over the multiple antennas during the MIMO mode to improve transmission robustness and transmission data rate.

20 Claims, 4 Drawing Sheets

Related U.S. Application Data continuation of application No. 13/338,137, filed on Dec. 27, 2011, now Pat. No. 8,625,699, which is a continuation of application No. 12/759,643, filed on Apr. 13, 2010, now Pat. No. 8,090,045, which is a continuation of application No. 11/110,623, filed on Apr. 19, 2005, now Pat. No. 7,711,060.

(60) Provisional application No. 60/637,343, filed on Dec. 17, 2004.

(56) References Cited

U.S. PATENT DOCUMENTS

| | | | |
|---|---|---|---|
| 7,430,244 | B2 | 9/2008 | Chung et al. |
| 7,613,243 | B2 | 11/2009 | Ouyang et al. |
| 7,711,060 | B1 | 5/2010 | Lou et al. |
| 7,729,438 | B2 | 6/2010 | Ouyang et al. |
| 7,773,680 | B2 | 8/2010 | Chen et al. |
| 8,351,524 | B2 * | 1/2013 | Zhou ............... 375/260 |
| 9,008,199 | B2 * | 4/2015 | van Nee ........... 375/260 |
| 2005/0078764 | A1 | 4/2005 | Gresset et al. |
| 2006/0002486 | A1 * | 1/2006 | van Nee ........... 375/260 |
| 2006/0088115 | A1 | 4/2006 | Chen et al. |
| 2006/0104377 | A1 * | 5/2006 | Chimitt et al. ..... 375/261 |
| 2006/0120311 | A1 | 6/2006 | Berkovich |
| 2007/0140100 | A1 * | 6/2007 | Ouyang et al. ..... 370/203 |
| 2007/0140364 | A1 * | 6/2007 | Ouyang et al. ..... 375/260 |
| 2011/0228878 | A1 * | 9/2011 | Sorrentino ........ 375/295 |
| 2012/0051447 | A1 * | 3/2012 | Qi et al. ........... 375/259 |

OTHER PUBLICATIONS

"Part 11: Wireless LAN Medium Access Control (MAC) and Physical Layer (PHY) Specifications: High-speed Physical Layer in 5 GHz Band", IEEE Std 802.11a-1999, Sep. 16, 1999.

"Part 11: Wireless LAN Medium Access Control (MAC) and Physical Layer (PHY) specifications: Higher-Speed Physical Layer Extension in the 2.4 GHz Band", IEEE Std 802.11b-1999.

"DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band", IEEE 802.11g/D8.2, Apr. 2003.

"Part 16: Air Interface for Fixed Broadband Wireless Access Systems", IEEE Std 802.16-2004, Oct. 2004.

"Draft 802.20 Permanent Document : System Requirements for IEEE 802.20 Mobile Broadband Wireless Access Systems—Version 14", IEEE 802.20-PD-06, Jul. 2004.

Lou, H. "Interleaver Simulations Results Feedback," Electronic Correspondence, Dec. 19, 2004, to be published by the USPTO, 1 page.

Ouyang, X. et al., "Modified TGnSync Interleaver", Version 2.0, Samsung Electronics, Oct. 4, 2004.

Mujtaba, S.A., "IEEE P802.11 Wireless LAN's—TGn Sync Proposal Technical Specification", Nov. 4, 2004.

Singh and Edwards, "IEEE P802.11n Wireless LAN's—WWiSE [IEEE 11n] Proposal: High throughput extension to the 802.11 Standard" Nov. 15, 2004.

Ouyang, X. et al., "Interleaver: current status and improved version", Samsung Electronics, Version 3.0, Nov. 29, 2004.

Ghosh and Li, "A really simple interleaver", Philips, Dec. 14, 2004.

Ouyang, X. et al, Samsung Interleaver: Simplified Version, Samsung Electronics, Dec. 14, 2004.

Li, P.C. et al., "Proposal Change Request-Interleaver", Dec. 15, 2004.

IEEE Computer Society, "TGn Sync Proposal Technical Specification", IEEE Std 802.11n—First Edition, May 2005.

* cited by examiner

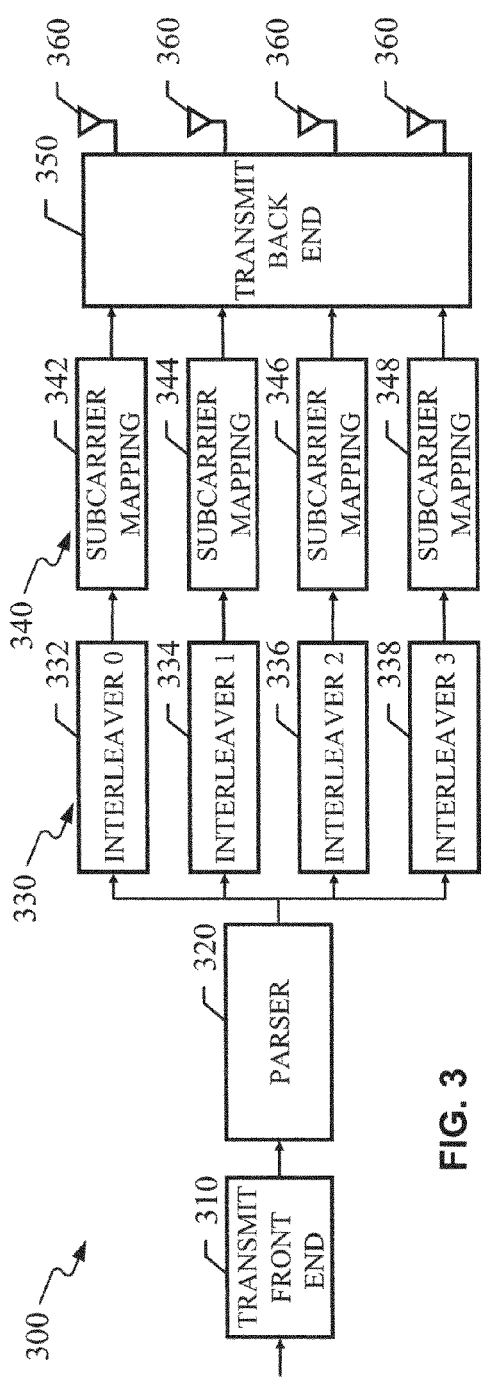
FIG. 3
FIG. 4
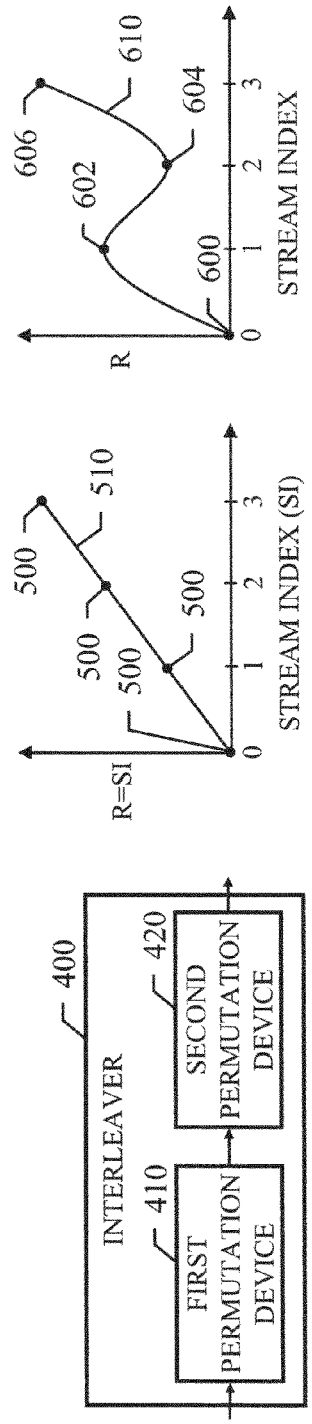
FIG. 5 (PRIOR ART)
FIG. 6

DATA STREAM INTERLEAVING WITH DIFFERENT ROTATION APPLIED TO CHANGED BIT STREAMS FOR SPATIALLY DIVERSE TRANSMISSION

CROSS REFERENCE TO RELATED APPLICATIONS

This application is a continuation of and claims the benefit of the priority of U.S. patent application Ser. No. 14/486,609, filed Sep. 15, 2014, entitled "Data Stream Interleaving With Non-Monotonically Arranged Data Rotations for Spatially Diverse Transmission," now U.S. Pat. No. 8,989,297, which is a continuation of and claims the benefit of the priority of U.S. patent application Ser. No. 14/148,353, filed Jan. 6, 2014, entitled "Data Stream Interleaving With Non-Monotonically Arranged Data Rotations for Spatially Diverse Transmission," now U.S. Pat. No. 8,837,623, which is a continuation of and claims the benefit of the priority of U.S. patent application Ser. No. 13/338,137, filed Dec. 27, 2011, entitled "Data Stream Interleaving With Non-Monotonically Arranged Data Rotations for Spatially Diverse Transmission," now U.S. Pat. No. 8,625,699, which is a continuation of and claims the benefit of the priority of U.S. patent application Ser. No. 12/759,643, filed Apr. 13, 2010, entitled "Data Stream Interleaving With Non-Monotonically Arranged Data Rotations for Spatially Diverse Transmission," now U.S. Pat. No. 8,090,045, which is a continuation of and claims the benefit of the priority of U.S. patent application Ser. No. 11/110,623, filed Apr. 19, 2005, entitled "Data Stream Interleaving With Non-Monotonically Arranged Data Rotations for Spatially Diverse Transmission," now U.S. Pat. No. 7,711,060, which claims the which claims the benefit of the priority of U.S. Provisional Application Ser. No. 60/637,343, filed Dec. 17, 2004 and entitled "Frequency Interleaver Design for MIMO WLAN Systems." The prior applications are hereby incorporated by reference.

BACKGROUND

The present disclosure describes systems and techniques relating to processing information before spatially diverse transmission.

Mobile phones, laptops, personal digital assistants (PDAs), base stations and other systems and devices can wirelessly transmit and receive data. Such systems and devices have used orthogonal frequency division multiplexing (OFDM) transmission schemes, such as those defined in the Institute of Electrical and Electronics Engineers (IEEE) 802 wireless communications standards. The IEEE 802 standards include IEEE 802.11, 802.11a, 802.11b, 802.11g, 802.11n, 802.16, and 802.20. In an OFDM system, in particular, a data stream is split into multiple substreams, each of which is sent over a different subcarrier frequency (also referred to as a tone or frequency tone).

Some wireless communication systems use a single-in-single-out (SISO) transmission approach, where both the transmitter and the receiver use a single antenna. Other wireless communication systems use a multiple-in-multiple-out (MIMO) transmission approach, where multiple spatially separated transmit antennas and multiple spatially separated receive antennas are used to improve data rates, link quality or both. This is known as antenna diversity, spatial diversity or spatially diverse transmission.

In addition to spatial diversity, many wireless communication systems also use time diversity and frequency diversity to improve system performance. Data streams can be encoded using channel encoders of different rates and with different amounts of redundancies, and the encoded data streams can be interleaved to separate adjacent coded bits. At the receiver, bit-streams that have been corrupted during transmission over the wireless channel are combined using error correction techniques to reconstruct the original information in the data bit-streams.

OFDM systems can be implemented as SISO or MIMO communication systems and can provide various advantages, including a relatively simple receiver architecture and potential performance improvements through appropriate coding across OFDM tones. For example, OFDM MIMO systems have been designed to interleave encoded bits using a separate block interleaver for each spatial stream, with a block size corresponding to the number of coded bits in a single OFDM symbol. Each interleaver effects a two-step permutation, where the first permutation ensures that adjacent coded bits are mapped onto nonadjacent subcarriers, and the second permutation ensures that coded bits are mapped alternately onto less and more significant bits of the constellation, thereby avoiding long runs of low reliability bits. In addition, various proposed interleavers can apply different data rotations to each spatial stream, before mapping to the subcarriers of an OFDM symbol, to improve the transmission.

SUMMARY

The present disclosure includes systems and techniques relating to processing multiple data streams transmitted over a wireless channel. According to an aspect of the described systems and techniques, a method includes obtaining multiple data streams to be transmitted over a wireless channel using spatially diverse transmission; and applying data rotations to respective data streams, in connection with interleaving the multiple data streams, where the applying includes using data rotation values with respective data streams such that the data rotation values plotted against stream indices correspond to a non-monotonic function. The data rotation values can be independent of a total number of the multiple data streams to be transmitted, the total number being selected from a set of integers including two, three and four. Moreover, the data rotation values can be fixed constants.

The spatially diverse transmission can occur in a frequency band selected from at least two frequency bands, and the applying can include using same data rotation values with respective data streams irrespective of the selected frequency band. The data rotations can include subcarrier rotations, the interleaving can include performing a first permutation and performing a second permutation, and the applying can include applying the subcarrier rotations to respective data streams. Applying the subcarrier rotations can occur after performing the first permutation and before performing the second permutation. Applying the subcarrier rotations can occur after performing the second permutation.

The data rotations can include column rotations, and the interleaving can include performing a first permutation and performing a second permutation, where performing the first permutation includes applying the column rotations to respective data streams. The method can further include selecting a number of the multiple data streams based at least in part on a condition of the wireless channel; and the obtaining the multiple data streams can include generating the multiple data streams from a source data stream based on the selected number. The method can further include preparing the multiple data streams for transmission in compliance with an IEEE 802.11n wireless communication standard. Moreover, the method can further include preparing the multiple data streams for transmission as high-throughput, orthogonal frequency division multiplexed (OFDM) signals.

According to another aspect of the described systems and techniques, an apparatus includes an input configured to receive data to be transmitted over a wireless channel using antenna diversity; and an interleaver section responsive to multiple data streams corresponding to the received data and configured to apply data rotations to respective data streams, where data rotation values used with respective data streams are such that the data rotation values plotted against stream indices correspond to a non-monotonic function. The data rotation values can be independent of a total number of the multiple data streams to be transmitted, the total number being selected from a set of integers including two, three and four. Moreover, the interleaver section can be further configured to use same data rotation values with respective data streams irrespective of a frequency band selected for transmission.

The data rotations can include subcarrier rotations. The data rotations can include column rotations. The apparatus can further include a transmit front end, a parser, a subcarrier mapping section, and a transmit backend.

According to another aspect of the described systems and techniques, a system includes a first device including a first wireless transceiver and multiple antennas; and a second device including a second wireless transceiver and multiple antennas, the second device being a mobile device operable to communicate with the first device over a wireless channel. The second wireless transceiver includes an input configured to receive data to be transmitted over the wireless channel using antenna diversity; and an interleaver section responsive to multiple data streams corresponding to the received data and configured to apply data rotations to respective data streams, where data rotation values used with respective data streams are such that the data rotation values plotted against stream indices correspond to a non-monotonic function.

Furthermore, the second wireless transceiver can be configured to prepare the multiple data streams for transmission as high-throughput, multiple-in-multiple-out (MIMO), orthogonal frequency division multiplexed (OFDM) signals; and the first wireless transceiver can be configured to receive the high-throughput, MIMO, OFDM signals, to determine that data rotation has been applied, and to un-rotate the multiple data streams in connection with de-interleaving the multiple data streams.

According to yet another aspect of the described systems and techniques, a method includes receiving multiple data streams that have been transmitted over a wireless channel using spatially diverse transmission; and applying inverse data rotations to respective data streams, in connection with de-interleaving the multiple data streams, where the applying includes using data rotation values with respective data streams such that the data rotation values plotted against stream indices correspond to a non-monotonic function. The data rotation values can be independent of a total number of the multiple data streams transmitted, the total number having been selected from a set of integers including two, three and four. Moreover, the data rotation values can be fixed constants.

The spatially diverse transmission can have occurred in a frequency band selected from at least two frequency bands, and the applying can include using same data rotation values with respective data streams irrespective of the selected frequency band. The inverse data rotations can include subcarrier rotations, the de-interleaving can include performing a first permutation and performing a second permutation, and the applying can include applying the subcarrier rotations to respective data streams. Applying the subcarrier rotations can occur after performing the first permutation and before performing the second permutation. Applying the subcarrier rotations can occur before performing the first permutation.

The inverse data rotations can include column rotations, and the de-interleaving can include performing a first permutation and performing a second permutation, where performing the second permutation includes applying the column rotations to respective data streams. The method can further include determining whether data rotation have been used in the multiple data streams received over the wireless channel. Moreover, the method can further include processing the multiple data streams received over the wireless channel in compliance with an IEEE 802.11n wireless communication standard.

According to yet another aspect of the described systems and techniques, an apparatus includes an input configured to receive data that has been transmitted over a wireless channel using antenna diversity; and a de-interleaver section responsive to multiple data streams corresponding to the received data and configured to apply inverse data rotations to respective data streams, where data rotation values used with respective data streams are such that the data rotation values plotted against stream indices correspond to a non-monotonic function. The data rotation values can be independent of a total number of the multiple data streams to be transmitted, the total number being selected from a set of integers including two, three and four. The de-interleaver section can be further configured to use same data rotation values with respective data streams irrespective of a frequency band selected for transmission. The inverse data rotations can include subcarrier rotations. The inverse data rotations can include column rotations. Moreover, the apparatus can further include a subcarrier de-mapping section.

The described systems and techniques can be implemented in electronic circuitry, computer hardware, firmware, software, or in combinations of them, such as the structural means disclosed in this specification and structural equivalents thereof. This can include a software program operable to cause one or more machines (e.g., a signal processing device) to perform operations described.

The described systems and techniques can result in increased performance, such as range. Performance can be improved by using a non-monotonic arrangement of rotation values. Moreover, the complexity of device implementation can be reduced, such as by using a fixed rotation value for each data stream, regardless of the total number of streams being transmitted, and/or using the same rotation values irrespective of a frequency band selected for transmission.

Details of one or more implementations are set forth in the accompanying drawings and the description below. Other features, objects and advantages may be apparent from the description and drawings, and from the claims.

DRAWING DESCRIPTIONS

FIG. 3 is a block diagram showing an example transmitter as can be used in a wireless communication system.

FIG. 4 is a block diagram showing an example interleaver as can be used in a transmitter.

FIG. 5 is a graph illustrating conventional data rotation values used in an interleaver section of a transmitter.

FIG. 6 is a graph showing non-monotonically arranged data rotation values used in an interleaver section of a transmitter.

Like reference symbols in the various drawings indicate like elements.

DETAILED DESCRIPTION

The systems and techniques described herein can be implemented as one or more devices, such as one or more integrated circuit (IC) devices, in a wireless communication device. For example, the systems and techniques disclosed can be implemented in a wireless local area network (WLAN) transceiver device (e.g., a WLAN chipset) suitable for use in an OFDM MIMO system.

Figure 1:
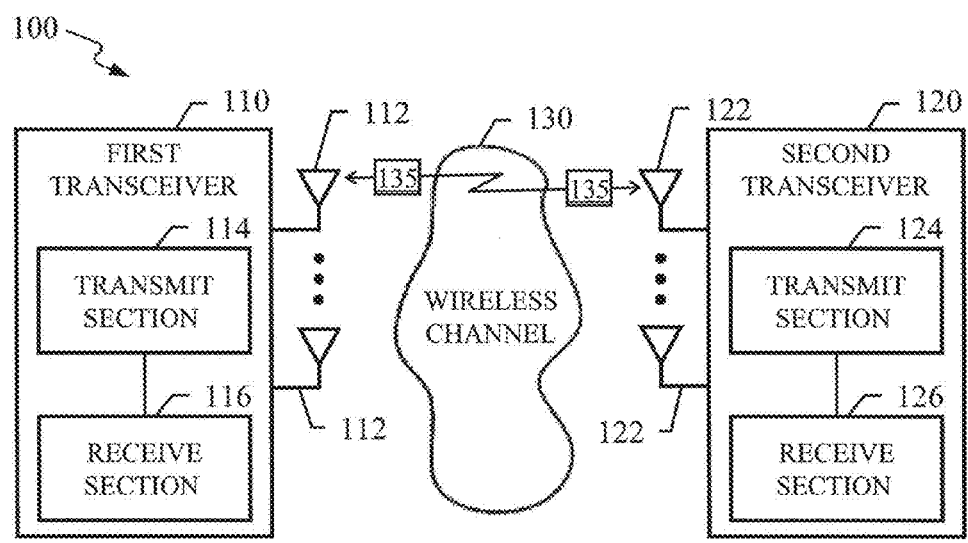
FIG. 1 is a block diagram showing a communication system.

FIG. 1 is a block diagram showing a communication system 100 that can employ data stream interleaving with non-monotonically arranged data rotations applied to respective data streams before spatially diverse transmission over a wireless channel 130. The communication system 100 is a multiple-in-multiple-out (MIMO) orthogonal frequency division multiplexed (OFDM) system. A first transceiver 110 has multiple antennas 112, and a second transceiver 120 has multiple antennas 122. In at least one implementation, the system 100 can dynamically change the number of data streams transmitted over the spatially separated antennas 112 to alter transmission robustness and transmission data rate as needed.

The transceiver 110 includes a transmit section 114 and a receive section 116, and the transceiver 120 includes a transmit section 124 and a receive section 126. The transceivers 110, 120 are sometimes referred to as transmitters and receivers for convenience, with the understanding that the systems and techniques described are applicable to wireless systems that use dedicated transmitters and receivers as well as transceivers generally. Moreover, a wireless transceiver employing the systems and techniques described can be included in any communication device, regardless of whether that device is a fixed device (e.g., a base station or a personal desktop computer) or a mobile device (e.g., a mobile phone or PDA).

Packetized information transmission involves the transmission of information over the wireless channel 130 in the form of discrete sections of information 135, often referred to as packets or frames. The wireless channel 130 can be a radio frequency (RF) channel, and the transceivers 110, 120 can be implemented to comply with one or more of the IEEE 802 wireless standards (including IEEE 802.11, 802.11a, 802.11b, 802.11g, 802.11n, 802.16, and 802.20).

In general, wireless channels are typically affected by two dominant phenomena (among others) known as fading and multipath effects. These two effects are typically random and time varying, and determine the receiver-signal-to-noise ratio (Rx-SNR). Signal processing techniques for recovering transmitted signals in light of these effects are well known. For example, in 802.11a/g wireless systems, the OFDM modulation mechanism is used, and predefined training symbols are included in the preambles of data frames for use in estimating characteristics of the wireless channel in order to equalize the channel.

In an OFDM modulation approach, the channel bandwidth is divided into narrow slices called tones, and symbols from a constellation (e.g., from a quadrature-amplitude modulated (QAM) constellation) are transmitted over the tones. In a high-throughput MIMO OFDM system (e.g., an IEEE 802.11n system), a different data stream can be sent on each transmit antenna. The separate bit streams handled by the different transmit antennas can be obtained by parsing a source bit stream, either bit-by-bit or by groups of bits, and each bit stream can be permuted by a frequency interleaver. To make the system 100 backward compatible (e.g., compatible with prior IEEE 802.11a/g systems) and to minimize hardware complexity, a modified version of a traditional frequency interleaver can be used.

Figure 2:
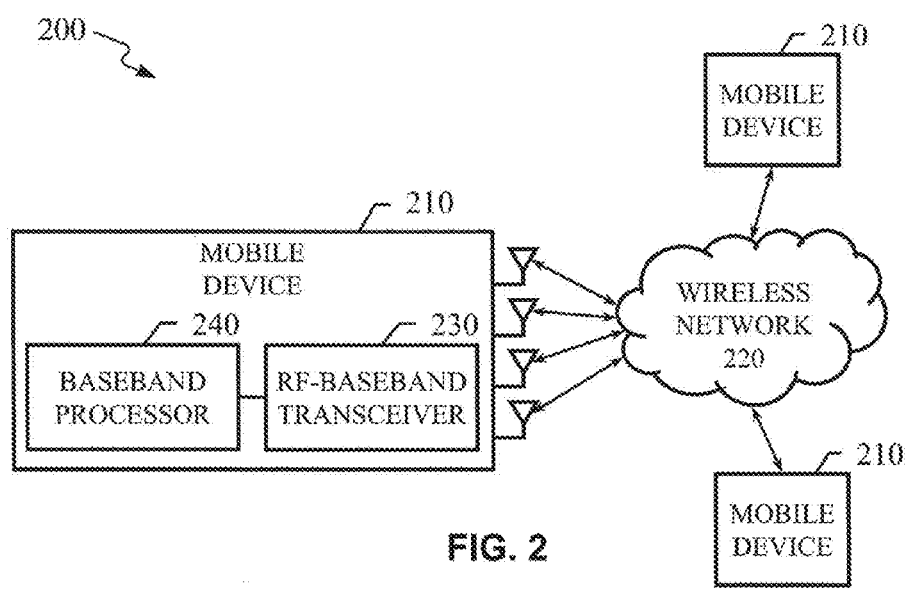
FIG. 2 is a block diagram showing a mobile device communication system.

FIG. 2 is a block diagram showing a mobile device communication system 200 that can employ data stream interleaving with non-monotonically arranged data rotations applied to respective data streams before spatially diverse transmission over a wireless network 220. The system 200 includes multiple mobile devices 210 operable to communicate with each other over the wireless network 220.

A mobile device 210 includes an RF-baseband transceiver 230 and a baseband processor 240. The transmit section and the receive section of the mobile device 210 can be spread across the RF-baseband transceiver 230 and the baseband processor 240. Moreover, the RF-baseband transceiver 230 and the baseband processor 240 can be two integrated circuit devices in a WLAN chipset configured for use in the mobile device 210.

FIG. 3 is a block diagram showing an example transmitter 300 as can be used in a wireless communication system. The transmitter 300 includes a transmitter front end 310, which can include, among other components, a convolutional encoder, which encodes an incoming data stream, and a puncturer, which punctures the bits of the data stream to different rates as needed (e.g., depending on rate 2/3 or rate 3/4 or rate 5/6).

The transmitter 300 can include a parser 320 that splits the convolutional encoded bitstream, either bit-by-bit or by groups of bits, into multiple streams, which are sent through an interleaver section 330, a subcarrier mapping section 340, and a transmitter back end 350 (e.g., to perform modulation, scaling, filtering, and so on, as appropriate for the implementation). The multiple bit streams are then transmitted over multiple respective antennas 360. The interleaver section 330 can include four interleavers 332, 334, 336, 338, and the subcarrier mapping section 340 can include four subcarrier mapping components 342, 344, 346, 348, corresponding to four antennas 360.

The total number of data streams to be transmitted (and thus the number of antennas 360 being used for a particular transmission) can be a dynamically controllable parameter. For example, the transmitter 300 may be operable in a SISO mode, where only the first antenna 360 and the corresponding interleaver 332 are used. Interleaver 332 can be designed to be backward compatible with prior SISO systems. For example, interleaver 332 can implement two permutations, the first of which being defined by:

$$i = N_{row} \times (k \bmod N_{column}) + \mathrm{floor}(k/N_{column})$$
$$k = 0, 1, \ldots, N_{CBPS} - 1 \qquad (1)$$

where the basic interleaver array has $N_{row}$ rows and $N_{column}$ columns, and $N_{CBPS}$ is the number of coded bits in a single OFDM symbol.

The variable k denotes the index of the coded bit before the first permutation, and i denotes the index after the first and before the second permutation, which can be defined by:

$$j = s \times \text{floor}(i/s) + (i + N_{CBPS} - \text{floor}(N_{column} \times i/N_{CBPS})) \bmod s \quad (2)$$

where $i = 0, 1, \ldots, N_{CBPS}-1$, $s = \max(N_{BPSC}/2, 1)$, and $N_{BPSC}$ is the number of coded bits per subcarrier. The variable j denotes the index after the second permutation and before modulation mapping.

FIG. 4 is a block diagram showing an example interleaver 400 as can be used in a transmitter. The first and second permutations described above can be implemented in first and second permutation devices 410, 420. These devices 410, 420 can be integrated circuitry configured to perform the defined permutations. Moreover, the integrated circuitry can have two or more discrete sections as shown, or this circuitry can be a unitary section of circuitry that effects the permutations described.

The remaining interleavers 334, 336, 338 from FIG. 3 can also be implemented in this fashion, however, when the transmitter 300 is operated in a MIMO mode, the interleavers 334, 336, 338 can include some form of data rotation to effect bit separation in the wireless channel across the spatially diverse transmission. The decoder at the receiving end of the transmission (e.g., a Viterbi detector) may have difficulty with consecutive bit errors without the proposed bit separation. Separating bits in the channel can prevent the bits from being subject to the same channel state, and thus, appropriate selection of the data rotations applied during interleaving of the data streams can introduce additional spatial and time diversity in the transmission, thereby improving performance.

For example, one proposal for performing data rotations uses a modified IEEE 802.11a/g interleaver to permute the bits in each stream. This proposed interleaver performs two permutation steps to interleave the bits, where the second permutation remains the same as in the conventional SISO interleaver, and the first permutation equation is modified to interleave the data according to:

$$i = N_{row} \times (((k \bmod N_{column}) + i_{SS}) \bmod N_{column}) + \text{floor}(k/N_{column}) \quad k = 0, 1, \ldots, N_{CBPS}-1 \quad (3)$$

where $i_{SS}$ is the stream index ($i_{SS} = 0, 1, \ldots, N_{SS}-1$), and $N_{SS}$ is the total number of data streams to be transmitted (e.g., if only two streams are transmitted, $N_{SS}$ is 2, and $i_{SS}$ can have the values 0 or 1). Thus, the term $i_{SS}$ is added to the first permutation equation of the conventional interleaver. Since the first data stream has $i_{SS}=0$, the interleaver applies the conventional permutation to the first stream (stream index zero). The second stream has $i_{SS}=1$, and thus a column rotation of one is applied to the second stream. The third stream has $i_{SS}=2$, and thus a column rotation of two is applied to the third stream. The fourth stream has $i_{SS}=3$, and thus a column rotation of three is applied to the fourth stream.

FIG. 5 is a graph illustrating conventional data rotation values 500 used in an interleaver section of a transmitter. In the proposal mentioned above, the data rotations 500 are equal to the stream index (SI): R=SI. Thus, a corresponding function 510 is a linear, monotonic function. The term "monotonic" means that successive members of a sequence (the sequence of R values plotted against SI) either consistently increase or decrease but do not oscillate in relative value.

Various other proposals have been made in order to improve performance. These other proposals have included providing an explicit subcarrier rotation at the output of the second permutation, rather than providing a column rotation; an explicit subcarrier mapping rotation is performed using $5 \times i_{SS} \times N_{BPSC}$ for stream $i_{SS}$. In this scheme, the rotation amount is dependent on the stream index and the modulation scheme used for the current transmission. Moreover, the corresponding function is still monotonic with stream index.

The column rotation scheme mentioned above provides an implicit frequency subcarrier rotation without having to explicitly calculate this value depending on the modulation scheme. Other column rotation proposals have suggested making the rotation value dependent not only on stream index, $i_{SS}$, but also on the total number of streams, $N_{SS}$. For example, one proposal involves modifying the first permutation equation to interleave the data according to:

$$i = N_{row} \times (((k \bmod N_{column}) + i_{SS} \text{floor}(N_{column}/N_{ss})) \bmod N_{column}) + \text{floor}(k/N_{column}) \quad (4)$$

Thus, the second stream is rotated by a different amount depending on how many total streams are to be transmitted. Other proposals include performing an explicit frequency subcarrier rotation, known as cyclic rotation, between permutation one and permutation two of the interleaver. These proposals also result in a corresponding monotonic function.

In contrast, the new proposals described herein involve judicious choices of the rotating parameters, which can result in a significant reduction in interleaver complexity and improved performance. FIG. 6 is a graph showing non-monotonically arranged data rotation values 600, 602, 604, 606 used in an interleaver section of a transmitter. As shown, when the number of data streams is greater than two, the rotation values 600, 602, 604, 606 plotted against stream indices correspond to a non-monotonic function 610.

A non-monotonic arrangement of rotation values can result in improved performance while at the same time making the rotation values independent of the total number of the data streams in the current transmission, which can result in reduced complexity. For example, when the transmission has two streams, the rotation value 602 for the second stream can be large enough to maximize the rotation distance between the two streams. When a third stream is added to the transmission, the rotation value 602 can stay the same for the second stream, and a rotation value 604 for the third stream can be placed between the rotation values 600, 602. Likewise, when a fourth stream is added to the transmission, the rotation values 602, 604 can stay the same, and a rotation value 606 can be added.

The rotation value for each stream can be a fixed constant, regardless of the $N_{SS}$ value for the current transmission. The data rotations can be column rotations, row rotations, explicit frequency subcarrier rotations, or a combination of these. The rotations can be performed between the first permutation 410 and the second permutation 420 or after the second permutation 420 (which can still be considered applying the rotations within the interleaver section, even if not implemented within an interleaver 400). Moreover, the same frequency subcarrier rotation values, the same column rotation values and the same row rotation values can be used irrespective of a selected frequency band (e.g., the same rotation values can be used for both 20 MHz and 40 MHz transmissions in IEEE 802.11n systems, even when different numbers of subcarriers are used).

In the case of column rotation, the first permutation can interleave the data according to:

$$i = N_{row} \times (((k \bmod N_{column}) + R) \bmod N_{column}) + \text{floor}(k/N_{column}) \quad (5)$$

where R denotes predetermined column rotation values. For example, R can be predetermined to be 0, 9, 5 and 13 for streams one, two, three and four (corresponding to $i_{SS}$=0, 1, 2, 3) respectively, regardless of the actual number of streams used in the current transmission. Note that the rotation value chosen for the second stream is larger than that for the third stream so that when there are only two streams to be transmitted, consecutive bits coming out the convolutional encoder are placed farther apart in the frequency domain to improve diversity and performance.

Where explicit frequency subcarrier rotation values are chosen, the rotation values can be 0, 25, 14 and 36 for streams one ($i_{SS}$=0), two ($i_{SS}$=1), three ($i_{SS}$=2) and four ($i_{SS}$=3) respectively. As another example, the rotation values for explicit frequency subcarrier rotation can be 0, 22, 11 and 33 for streams one ($i_{SS}$=0), two ($i_{SS}$=1), three ($i_{SS}$=2) and four ($i_{SS}$=3) respectively. These types of non-monotonic data rotation rules can result in better performance and reduced implementation complexity.

Figure 7:
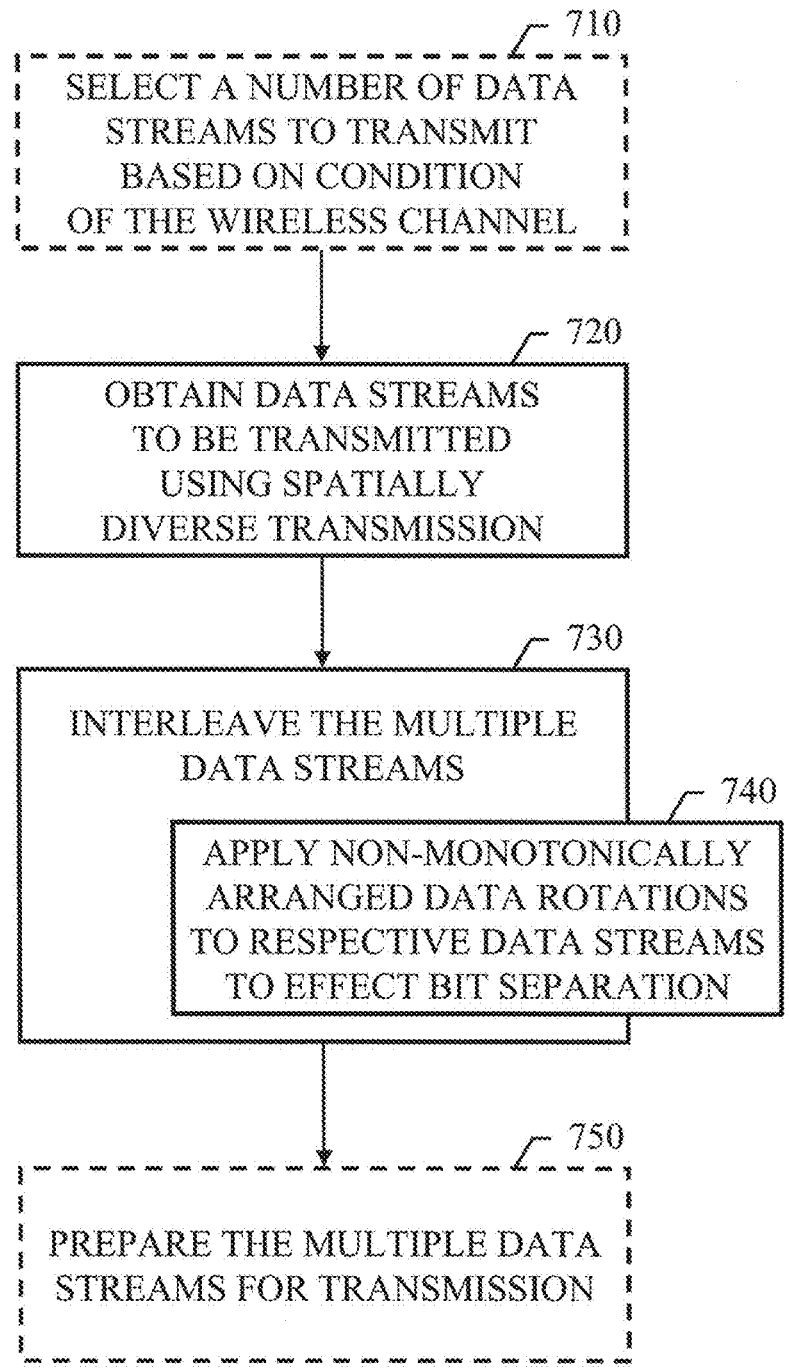
FIG. 7 is a flowchart showing example data processing, including interleaving with non-monotonically arranged data rotations applied to respective data streams, before wireless transmission.

FIG. 7 is a flowchart showing example data processing, including interleaving with non-monotonically arranged data rotations applied to respective data streams, before wireless transmission. The number of data streams to transmit can be selected, based at least in part on a condition of the wireless channel, at 710. Various channel condition information and desired data rate information can be used in deciding how many data streams to transmit. The operations underlying this decision on the number of streams to transmit can be implemented in a physical layer interface (PHY) component of a transceiver, a medium access control (MAC) component of a transceiver, or both. For example, the transmit streams decision can be made by an RF-Baseband transceiver and a baseband processor based on received input and estimation of channel conditions.

Multiple streams can be used to improve throughput, range or both. Transmitting non-identical values in multiple streams, if channel conditions allow, can increase throughput. Transmitting the same data in multiple streams (using spatial coding) can result in a better signal-to-noise-ratio (SNR) and a better signal range.

In general, the number of data streams selected depends on how the multiple transmit antennas are to be used in a given situation, and the number of data streams transmitted, $N_{SS}$, is a programmable parameter that can change dynamically from packet to packet. Additionally, selection of transmission parameters can also include selection of a frequency band (e.g., a 20 MHz band or a 40 MHz band in an IEEE 802.11n high-throughput MIMO OFDM system) for the spatially diverse transmission.

The data streams to be transmitted over a wireless channel using spatially diverse transmission are obtained at 720. This obtaining can involve receiving the multiple data streams from another component or generating the multiple data streams from a source data stream based on the selected number of streams to transmit. Such generation of the streams can be implemented by a signal splitter or a parser component. When non-identical values are to be transmitted in the multiple streams, stream generation can involve bit-by-bit parsing or bit-groups parsing.

The multiple data streams are interleaved at 730, and in connection with this, data rotations are applied to respective data streams at 740 to effect bit separation in the wireless channel across the spatially diverse transmission. The application of the data rotations can be an integral part of the interleaving (e.g., column rotations being performed as part of performing the first of two permutations of the interleaving), or the data rotations can be applied separately from the interleaving (e.g., subcarrier rotations applied after the first and second permutations of the interleaving). In either case, the data rotations can be implemented along with the interleaving in an interleaver section of a transceiver. Moreover, in the case of frequency band selection, the same data rotation values can be used with respective data streams irrespective of the selected frequency band.

The data rotation values used with respective data streams are such that the data rotation values plotted against stream indices correspond to a non-monotonic function. These data rotation values can have some dependence on other factors, or they can be fixed constants. In any event, the data rotation values can be independent of a total number of the multiple data streams to be transmitted (i.e., the data rotation values do not change with changes in $N_{SS}$ alone).

After interleaving and data rotations, the multiple data streams can be prepared for transmission at 750. This can involve preparing the multiple data streams for transmission as high-throughput, orthogonal frequency division multiplexed (OFDM) signals. Moreover, this can involve preparing the multiple data streams for transmission in compliance with an IEEE 802.11n wireless communication standard. Such preparation can be implemented in the subcarrier mapping section 340 and the back end 350 of a transmitter.

Figure 8:
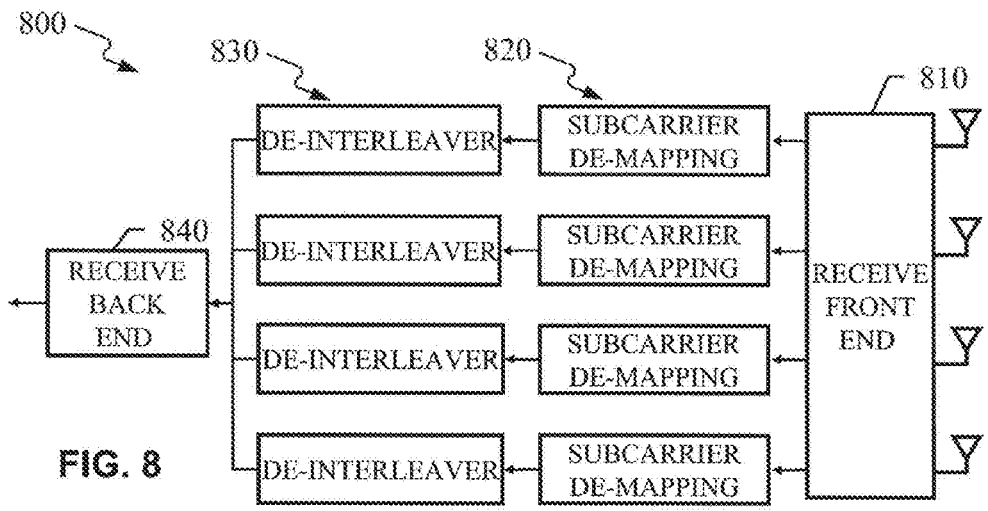
FIG. 8 is a block diagram showing an example receiver as can be used in a wireless communication system.

FIG. 8 is a block diagram showing an example receiver 800 as can be used in a wireless communication system. The receiver 800 includes a receiver front end 810, a subcarrier de-mapping section 820, a de-interleaver section 830, and a receiver back end 840. Data that has been transmitted over a wireless channel using antenna diversity can be received and processed in compliance with an IEEE 802.11n wireless communication standard. Moreover, the de-interleaver section 830 can be responsive to multiple data streams corresponding to the received data and can be configured to apply inverse data rotations to respective data streams, where data rotation values used with respective data streams are such that the data rotation values plotted against stream indices correspond to a non-monotonic function.

Figure 9:
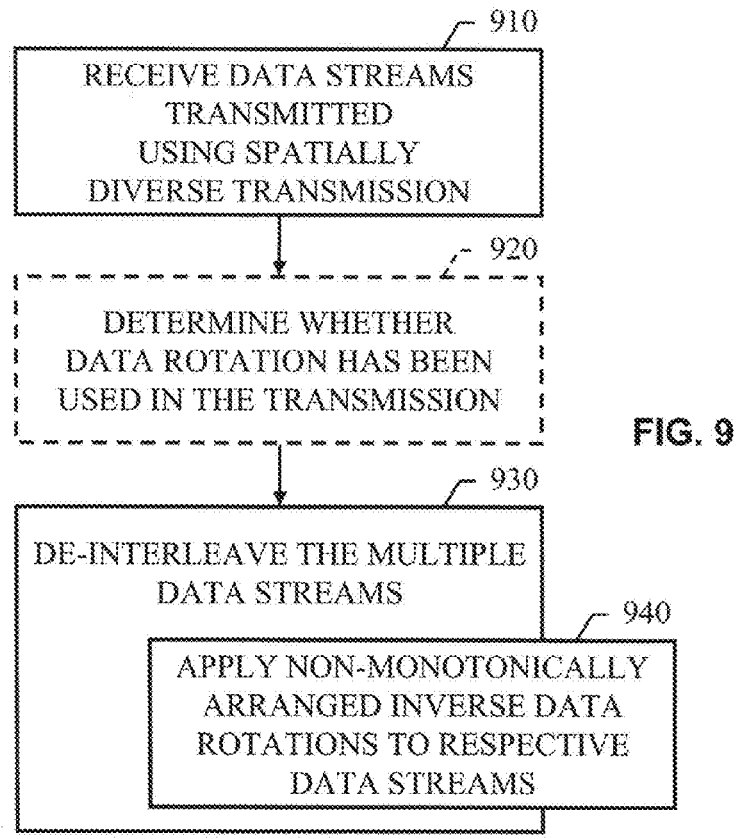
FIG. 9 is a flowchart showing example data processing, including de-interleaving with non-monotonically arranged inverse data rotations applied to respective data streams after wireless reception.

FIG. 9 is a flowchart showing example data processing, including de-interleaving with non-monotonically arranged inverse data rotations applied to respective data streams after wireless reception. Multiple data streams, which have been transmitted over a wireless channel using spatially diverse transmission, are received at 910. A determination can be made, at 920, as to whether data rotation has been used in the multiple data streams received over the wireless channel. Furthermore, inverse data rotations are applied to respective data streams at 940, in connection with de-interleaving the multiple data streams at 930, where the data rotation values used with respective data streams are such that the data rotation values plotted against stream indices correspond to a non-monotonic function.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a software program operable to cause one or more machines to perform the operations described. It will be appreciated that the order of operations presented is shown only for the purpose of clarity in this description. No particular order is required for these operations, and some or all of the operations may occur simultaneously in various implementations. Moreover, not all of the operations shown need be performed to achieve desirable results.

Other embodiments fall within the scope of the following claims.

What is claimed is:

1. An apparatus comprising:
a parser configured to split a first bit stream into two or more second bit streams during a multiple-in-multiple-out (MIMO) mode of transmission;
an interleaver section coupled with the parser, the interleaver section configured to perform separate interleaving of the two or more second bit streams during the MIMO mode of transmission, wherein a first portion of the interleaver section that handles a first of the two or more second bit streams employs a same interleaver operation as during a single-in-single-out (SISO) mode of transmission;
a subcarrier mapping section coupled with the interleaver section, the subcarrier mapping section configured to perform separate mapping of subcarriers in the two or more second bit streams during the MIMO mode of transmission; and
a transmit back end coupled with the subcarrier mapping section to connect with multiple antennas,
wherein the interleaver section is configured to apply different rotations to dynamically changed second, third, and fourth ones of the two or more second bit streams transmitted over the multiple antennas during the MIMO mode of transmission to improve transmission robustness and transmission data rate.

2. The apparatus of claim 1, wherein each of the different rotations has a constant rotation value for its corresponding stream index regardless of how many data streams are currently being transmitted, a second of the constant rotation values used for a second stream is larger than a first of the constant rotation values used for a first stream, a third of the constant rotation values used for a third stream is greater than the first rotation value but less than the second rotation value, and a fourth of the constant rotation values used for a fourth stream is greater than the second rotation value.

3. The apparatus of claim 2, wherein the first rotation value is zero, the second rotation value is twenty five, the third rotation value is fourteen, and the fourth rotation value is thirty six.

4. The apparatus of claim 2, wherein the first rotation value is zero, the second rotation value is twenty two, the third rotation value is eleven, and the fourth rotation value is thirty three.

5. The apparatus of claim 2, wherein the rotations comprise explicit frequency subcarrier rotations.

6. The apparatus of claim 2, wherein the transmission occurs in a frequency band selected from at least two frequency bands, and same rotation values are used with respective data streams irrespective of the selected frequency band.

7. The apparatus of claim 2, wherein the transmission occurs in compliance with an IEEE 802.11 wireless communication standard.

8. The apparatus of claim 1, wherein the interleaver section comprises a separate block interleaver for each of the two or more second bit streams, with a block size corresponding to a number of coded bits in a single Orthogonal Frequency Division Multiplexing (OFDM) symbol.

9. A method comprising:
splitting a first bit stream into two or more second bit streams using a parser during a multiple-in-multiple-out (MIMO) mode of transmission;
performing separate interleaving of the two or more second bit streams during the MIMO mode of transmission using an interleaver section, wherein a first portion of the interleaver section that handles a first of the two or more second bit streams employs a same interleaver operation as during a single-in-single-out (SISO) mode of transmission;
performing separate mapping of subcarriers in the two or more second bit streams during the MIMO mode of transmission using a subcarrier mapping section; and
applying, by the interleaver section, different rotations to dynamically changed second, third, and fourth ones of the two or more second bit streams transmitted over multiple antennas during the MIMO mode of transmission to improve transmission robustness and transmission data rate.

10. The method of claim 9, wherein each of the different rotations has a constant rotation value for its corresponding stream index regardless of how many data streams are currently being transmitted, a second of the constant rotation values used for a second stream is larger than a first of the constant rotation values used for a first stream, a third of the constant rotation values used for a third stream is greater than the first rotation value but less than the second rotation value, and a fourth of the constant rotation values used for a fourth stream is greater than the second rotation value.

11. The method of claim 10, wherein the first rotation value is zero, the second rotation value is twenty five, the third rotation value is fourteen, and the fourth rotation value is thirty six.

12. The method of claim 10, wherein the first rotation value is zero, the second rotation value is twenty two, the third rotation value is eleven, and the fourth rotation value is thirty three.

13. The method of claim 10, wherein the rotations comprise explicit frequency subcarrier rotations.

14. The method of claim 10, comprising:
selecting a frequency band, for the transmission, from at least two frequency bands; and
using same rotation values with respective data streams irrespective of the selected frequency band.

15. The method of claim 10, wherein the transmission occurs in compliance with an IEEE 802.11 wireless communication standard.

16. An apparatus comprising:
a receive front end to connect with multiple antennas, the receive front end configured to receive a single bit stream during a single-in-single-out (SISO) mode of transmission and receive two or more bit streams during a multiple-in-multiple-out (MIMO) mode of transmission, wherein different rotations are applied to dynamically changed second, third, and fourth ones of the two or more bit streams received over the multiple antennas during the MIMO mode of transmission to improve transmission robustness and transmission data rate;
a subcarrier de-mapping section coupled with the receive front end, the subcarrier de-mapping section configured to perform separate de-mapping of subcarriers in the two or more bit streams during the MIMO mode of transmission;
a de-interleaver section coupled with the subcarrier de-mapping section, the de-interleaver section configured to perform separate de-interleaving of the two or more bit streams during the MIMO mode of transmission, wherein a first portion of the de-interleaver section that handles a first of the two or more bit streams employs a same de-interleaver de-operation as during the SISO mode of transmission; and
a receive back end configured to combine the two or more bit streams from the de-interleaver section during the MIMO mode of transmission.

17. The apparatus of claim 16, wherein each of the different rotations has a constant rotation value for its corresponding stream index regardless of how many data streams are currently being transmitted, a second of the constant rotation values used for a second stream is larger than a first of the constant rotation values used for a first stream, a third of the constant rotation values used for a third stream is greater than the first rotation value but less than the second rotation value, and a fourth of the constant rotation values used for a fourth stream is greater than the second rotation value.

18. The apparatus of claim 17, wherein the first rotation value is zero, the second rotation value is twenty five, the third rotation value is fourteen, and the fourth rotation value is thirty six.

19. The apparatus of claim 17, wherein the first rotation value is zero, the second rotation value is twenty two, the third rotation value is eleven, and the fourth rotation value is thirty three.

20. The apparatus of claim 17, wherein the rotations comprise explicit frequency subcarrier rotations.

* * * * *